United States Patent
Ennis

(10) Patent No.: US 8,756,301 B2
(45) Date of Patent: Jun. 17, 2014

(54) SYSTEMS AND METHODS FOR ORGANIC KNOWLEDGE BASE RUNBOOK AUTOMATION

(75) Inventor: Shawn Patrick Ennis, St. Charles, IL (US)

(73) Assignee: Monolith Technology Services, Inc., St. Charles, IL (US)

(*) Notice: Subject to any disclaimer, the term of this patent is extended or adjusted under 35 U.S.C. 154(b) by 96 days.

(21) Appl. No.: 13/116,066

(22) Filed: May 26, 2011

(65) Prior Publication Data

US 2012/0303772 A1    Nov. 29, 2012

(51) Int. Cl.
*G06F 15/173* (2006.01)

(52) U.S. Cl.
USPC .................................................. 709/223

(58) Field of Classification Search
CPC .................................................. H04L 41/0213
USPC ............. 705/35; 707/793; 709/223, 224, 793; 714/15; 715/704, 764
See application file for complete search history.

(56) References Cited

U.S. PATENT DOCUMENTS

| | | | | |
|---|---|---|---|---|
| 7,853,683 | B1* | 12/2010 | Dini et al. | 709/224 |
| 8,533,608 | B1* | 9/2013 | Tantiprasut | 715/751 |
| 2004/0122823 | A1* | 6/2004 | Baffes et al. | 707/100 |
| 2009/0172535 | A1* | 7/2009 | Cheng et al. | 715/704 |
| 2009/0172537 | A1* | 7/2009 | Cheng et al. | 715/704 |
| 2010/0037095 | A1* | 2/2010 | Gerber | 714/15 |
| 2010/0042449 | A1* | 2/2010 | Thomas | 705/7 |
| 2010/0191771 | A1* | 7/2010 | Jones | 707/793 |
| 2010/0268565 | A1* | 10/2010 | Trinon et al. | 705/8 |
| 2011/0161848 | A1* | 6/2011 | Purcell et al. | 715/764 |
| 2012/0016978 | A1* | 1/2012 | Bosworth et al. | 709/224 |

* cited by examiner

*Primary Examiner* — Otis L Thompson, Jr.
*Assistant Examiner* — Jael Ulysse
(74) *Attorney, Agent, or Firm* — Meister Seelig & Fein LLP

(57) ABSTRACT

The present invention is directed towards systems and methods for automating runbook documentation. The method according to one embodiment of the present invention comprises receiving a network event and determining whether the event is a known or unknown event. The method comprises executing a policy associated with the event if the event is known event. The method comprises passing the event to the operator for review against a database of existing runbooks if the event is an unknown event. The method comprises executing an existing policy if the operator identifies a runbook for the runbook event. The method comprises requesting a new policy for the event if the operator does not identify an existing runbook for the event.

19 Claims, 4 Drawing Sheets

SYSTEMS AND METHODS FOR ORGANIC KNOWLEDGE BASE RUNBOOK AUTOMATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to automating the organic growth of a runbook knowledge base. More specifically, embodiments of the present invention are directed towards systems and methods for receiving network events, associating events with policies, and providing runbooks on the basis of an automated runbook knowledge base system.

BACKGROUND OF THE INVENTION

Network operations centers ("NOC") typically deploy centralized event/fault management platforms to provide a consolidated console for the presentation of issues that require attention. These event consoles alert NOC personnel of the issues that need to be addressed, but they do not include directions for Tier 1 and 2 operators for remediating these problems. Often, NOCs build out so-called runbooks; large binders containing information regarding the manner in which to solve specific issues that come into event consoles. These binders provided valuable information, but are difficult to update and maintain due to the manual nature of updating the binders.

Only recently have NOCs attempted to remedy the deficiencies (manual creation and difficulty to maintain) of physical runbooks. One approach has been to use collaborative web-based technologies to store runbooks (e.g., "Wikis"). These Wikis, however, suffer from a lack of integration with event consoles. Thus, NOC personnel are still required to search through the runbooks, which may result in missing relevant runbooks or identifying false positive runbooks.

Despite these advancements, there is still a current need in the art for systems and methods to fully automate runbook systems. In particular, there is a need to automate remedial actions and updating of runbooks. Specifically, there is a need in the art for systems and methods for automatically recognizing events that have runbooks associated therewith and perform the remediation steps without operator intervention.

SUMMARY OF THE INVENTION

The present invention is directed towards systems, methods and computer program products for organically automating the associations between events and runbooks. In one embodiment, a method receives a network event and determines whether the event is a known or unknown event. The method executes a policy associated with the event if the event is known event, but passes the event to the operator for review against a database of existing runbooks if the event is an unknown event. The method executes an existing policy if the operator identifies a runbook for the event. If the operator does not identify an existing runbook for the event, a new policy is requested for managing or otherwise resolving the event.

In one embodiment, executing a policy and executing an existing policy occur automatically. In an alternative embodiment, executing a policy and executing an existing policy occur in response to a request from a network operator. In another alternative embodiment, executing a policy associated with the event if the event is known event comprises searching for an existing runbook associated with the event for execution of any contained policies.

As indicated above, the method may request a new policy for the event if the operator does not identify an existing runbook for the event. In one embodiment, the method comprises storing runbooks in response to a request from a network operator for the creation of a new runbook for an unknown event, wherein the new runbook may be created by a network administrator. In another embodiment, the method comprises associating existing runbooks with unknown events.

The present invention is also directed towards a system comprising a policy data store operative to store policies created by a network administrator and an events data store operative to store events. In one embodiment, the system comprises at least one network operator workstation and at least one network administrator workstation communicatively coupled to the knowledge base server.

The system comprises a knowledge base operative to store runbooks associated with events within the events data store and return runbooks in response to a request from a network operator for runbooks associated with a given event. In one embodiment, the knowledge base is operative to store runbooks in response to a request from a network operator for the creation of a new runbook for an unknown event, wherein the new runbook is created by a network administrator. In an alternative embodiment, the knowledge base server is operative to be searched by a network operator for an existing runbook. In another embodiment, the knowledge base server is operative to associate existing runbooks with unknown events.

The system additionally contains a policy engine, which according to certain embodiments is operative to associate new events with existing runbooks and policies, as well as execute policies for known events. In one embodiment, the policy engine is operative to execute policies for a known event automatically. In an alternative embodiment, the policy engine is operative to execute policies for a known event in response to a request from a network operator.

The present invention is directed towards computer readable media comprising program code comprising program code for receiving a network event and program code for determining whether the event is a known or unknown event. The computer readable media comprises program code for executing a policy associated with the event if the event is known event. The computer readable media comprises program code for passing the event to the operator for review against a database of existing runbooks if the event is an unknown event and program code for executing an existing policy if the operator identifies a runbook for the runbook event.

In one embodiment, executing a policy and executing an existing policy occur automatically. In an alternative embodiment, executing a policy and executing an existing policy occur in response to a request from a network operator. The computer readable media may comprise program code for requesting a new policy for the event if the operator does not identify an existing runbook for the event. In one embodiment, the computer readable media comprises program code for storing runbooks in response to a request from a network operator for the creation of a new runbook for an unknown event, wherein the new runbook is created by a network administrator.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

Figure 1:
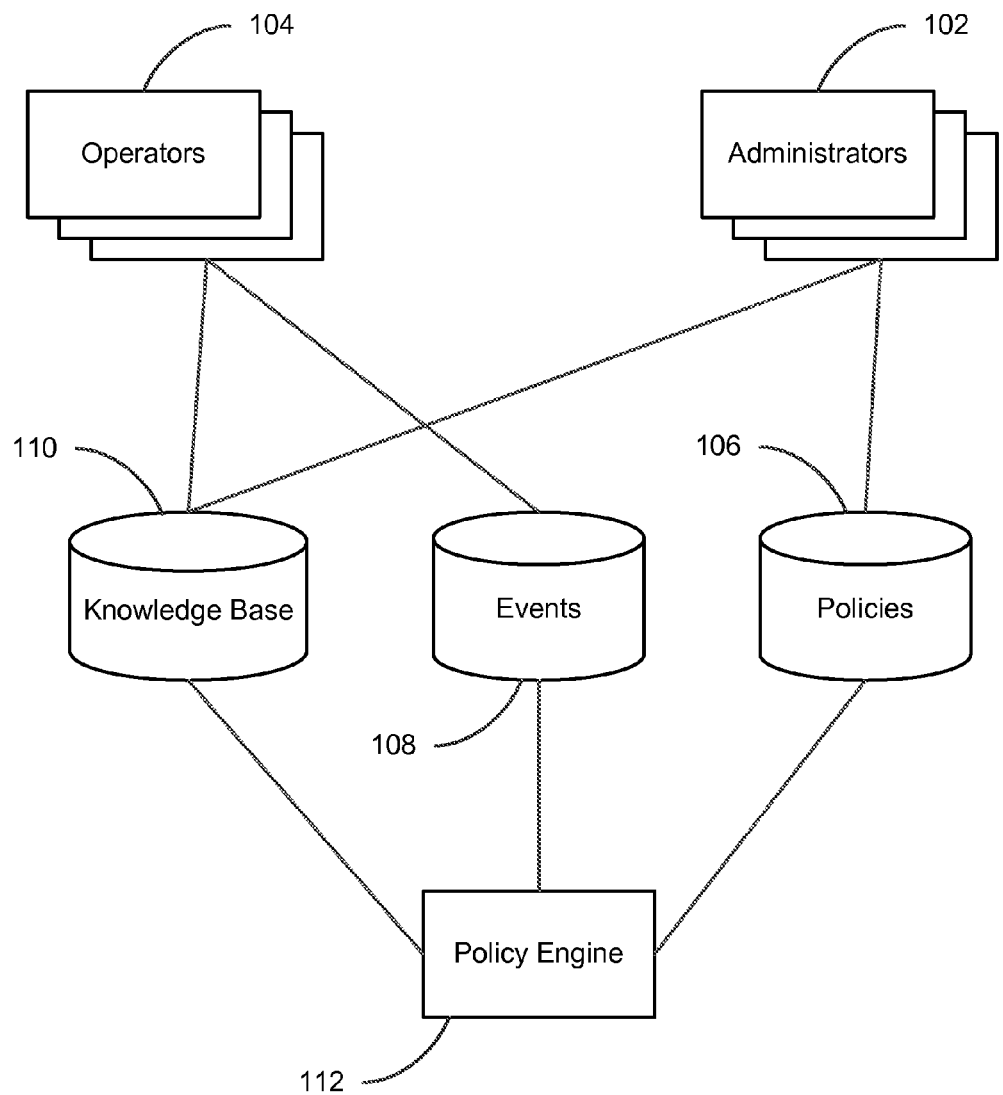
FIG. 1 presents a block diagram depicting a system for storing events, policies, and runbooks according to one embodiment of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention. FIG. 1 presents a block diagram depicting a system for storing events, policies, and runbooks according to one embodiment of the present invention.

As the embodiment of FIG. 1 illustrates, a plurality of network operators 104 and administrators 102 interact with databases 106, 108, and 110 to manage events and set procedures. In the illustrated embodiment, databases 106, 108, and 110 and policy engine 112 may reside on interconnected servers, or, in the alternative, may reside on a single server. In the present embodiment, network operators 104 are responsible for day-to-day management of a given network. That is, network operators 104 handle and resolve events as they occur during the regular course of network business. In contrast, network administrators 102 are charged with generating policies to remedy network events. Additionally, network administrators 102 create runbooks, or documentation, to be stored within knowledge base 110 for subsequent retrieval by network operators 104 or the policy engine 112 when encountering a given network event.

System 100 contains a plurality of databases including a knowledge base 110, events database 108, and policies database 106. In the present embodiment, each of the databases 106, 108, and 110 may comprise a hardware device (e.g., a server) containing program code operative to store data structures (e.g., a relational database management system). In alternative embodiments, the databases 106, 108, and 110 may implement various storage structures, such as flat files, or other storage techniques.

In the embodiment of FIG. 1, events database 108 may store various properties relating to network events such as the type of an event and/or the network elements affected by the event. In general, the events database 108 stores events in such a manner that the database may be consulted when a new event occurs to determine if the event has previously occurred or is otherwise known (specifically or by event type). Policies database 106 may store a plurality of policies that a given operator 104 should take in response to detection of a given event. In one embodiment, a policy stored within policy database 106 may contain a plurality of commands generated by administrators 102 to be executed automatically, or by operators 104. Knowledge base 110 may comprise one or more runbooks (e.g., documentation), in addition to other information, associated with one or more events. In the illustrated embodiment, a runbook may comprise textual documentation of the steps to be taken in response to receipt of the given event and may contain a reference to appropriate policies (stored in policies database 106) for execution.

System 100 additionally contains a policy engine 112 coupled to the database 106, 108, and 110. In the illustrated embodiment, the policy engine 112 is responsible for executing the policies stored in database 106 in response to receipt of specific network events. Policy engine 112 is discussed more fully with respect to FIG. 2.

Figure 2:
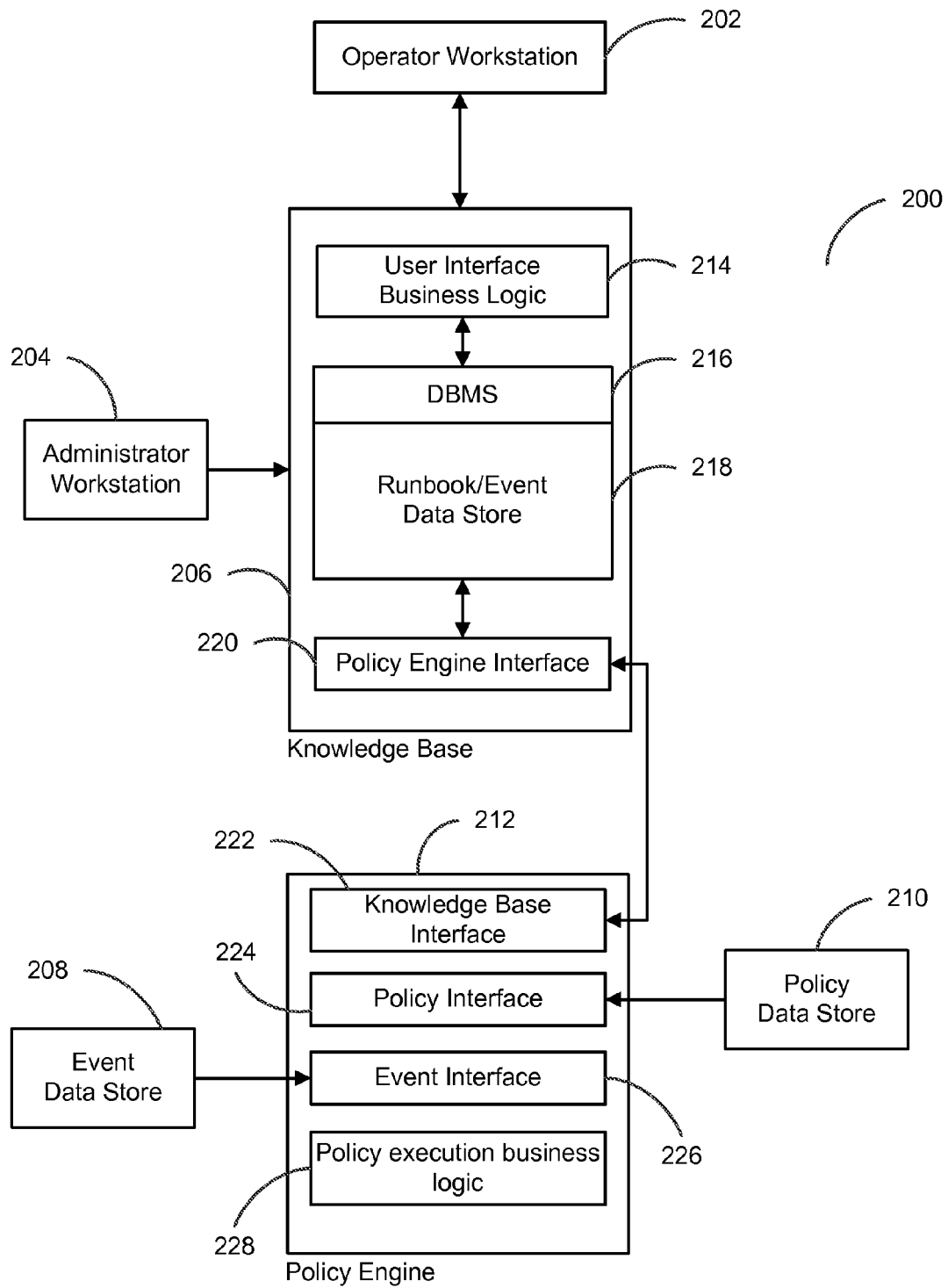
FIG. 2 presents a block diagram illustrating a system for detecting events and providing one or more runbooks associated with the event according to one embodiment of the present invention.

FIG. 2 presents a block diagram illustrating a system for detecting events and providing one or more runbooks associated with the event according to one embodiment of the present invention. According to the embodiment of FIG. 2, a system 200 contains one or more operator workstations 202 and administrator workstations 204. Workstations 202 and 204 may comprise a general purpose computing system operative to interface with the knowledge base 206 and other network based resources. Additionally, workstations 202 and 204 may be equipped with various software applications to manage a computer network.

Operator workstations 202 interact with the knowledge base 206 via user interface ("UI") business logic, step 214. UI business logic 214 may comprise executable files and/or circuitry allowing the network operator to query and inspect the runbooks and associated events stored within the knowledge base 206. In one embodiment, the UI business logic 214 may be stored within the knowledge base 206. In alternative embodiments, the UI business logic 214 may be transmitted to the operator workstation 202 via a network connection (e.g., a "thin client"). In another embodiment, UI business logic 214 may be stored locally on the operator workstation (e.g., a "thick client"). Various combinations of the aforementioned embodiments are also contemplated as falling within the scope of the present invention.

The UI business logic 214 is operative to access the runbook/event data store 218 via a data base management system ("DBMS") 216. In the illustrated embodiment, the DBMS interfaces between the UI business logic and the back-end data store to allow the administrators and operators to access the database with user-friendly interfaces. That is, the DBMS abstracts the lower level data transfer and manipulation operations from the administrators and operators.

Knowledge base 206 comprises a runbook/event data store ("REDS") 218. In the illustrated embodiment, the REDS 218 stores documentation for given events in the form of runbooks. In one embodiment, a given runbook contains a description of the policies to be executed in response to a given event as well as textual descriptions of the events and policies. A given runbook may also set forth standard operating procedures for operators to follow in any given situation. In addition to storing runbooks, REDS 218 additionally stores a relationship between the runbooks and events. In this manner, REDS 218 may utilize a relational database, or similar structure, to associate events with runbooks.

System 200 comprises a policy engine interface 220 and a knowledge base interface 222. In the illustrated embodiments, interfaces 220 and 222 allow the knowledge base 206 and policy engine 212 to communicate using one or more interfacing protocols. In the illustrated embodiment, policy engine 212 is operative to execute policies identified by the runbooks. Policy engine 212 is operative to transmit unknown events to knowledge base 206 and contains an event interface 226 that allows the policy engine to communicate with the event data store 208. Additionally, policy engine 212 contains a policy interface 224 that allows the policy engine 212 to communicate with the policy data store 210. The interaction between the policy engine 212, event data store 208, policy data store 210, and the knowledge base 206 is discussed more fully with respect to FIGS. 2 and 3.

The policy engine 212 comprises policy execution business logic ("PEBL") 228. In the illustrated embodiment, PEBL coordinates the execution of policies stored within policy data store 210, which may be executed in response to the detection of events stored within event data store 208. In one embodiment, policies may be executed automatically upon the detection of a known event with a corresponding runbook identifying one or more policies. In an alternative embodiment, PEBL 228 may execute policies under the direction and control of a network operator or administrator.

Figure 3:
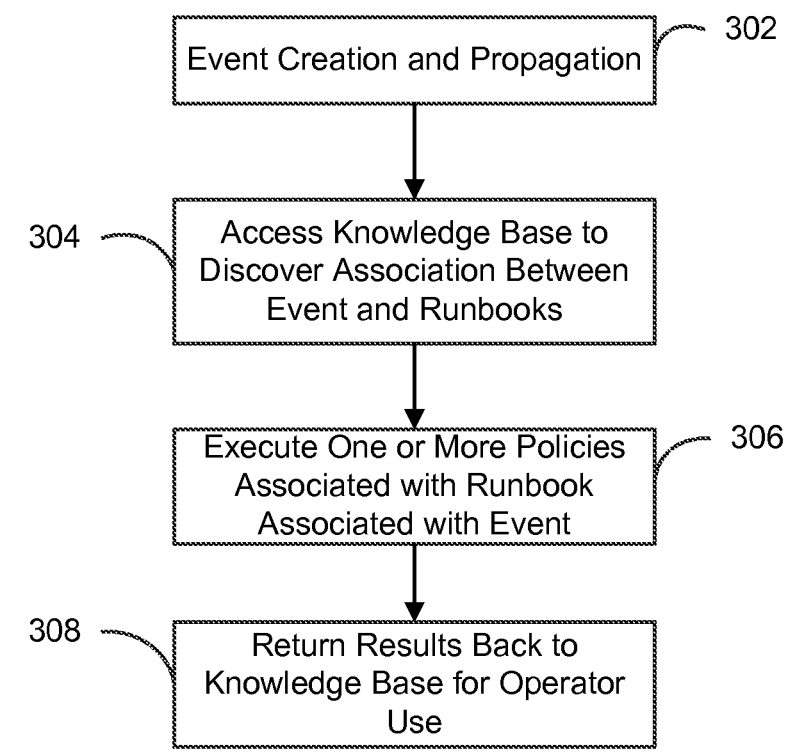
FIG. 3 presents a flow diagram illustrating a method for discovering associations between events and policies according to one embodiment of the present invention.

FIG. 3 presents a flow diagram illustrating a method for discovering associations between events and policies according to one embodiment of the present invention. According to the embodiment that FIG. 3 illustrates, a plurality of events are created and propagated over a network, step 302. A variety of situations within a network may lead to the generation of events including, but not limited to, devices not responding, missing routes, etc. An event may occur due, e.g., to a fault, or other perceived problem within the network, and may be propagated across the network for receipt by a network operator workstation.

A network operator may access a knowledge base to discover associations between events and runbooks, step 304. A network operator may be able to select a given event and be directed towards a runbook stored in a knowledge base, the runbook containing documentation relating to the event and identifying one or more policies associated with the event. In one embodiment, network administrators generate runbooks prior to the occurrence of an event, but, as is discussed herein, may be generated in response to events as they occur. Furthermore, runbooks may be updated dynamically, which may occur in response to events propagating through the network.

The operator may execute one or more policies associated with the event, step 306. In the illustrated embodiment, the operator executes policies as defined in runbooks previously identified in step 304. In alternative embodiments, the method 300 may automatically execute policies after detecting the occurrence of an event.

The method 308 returns the results of the policy execution back to the knowledge base for operator use, step 308. In one embodiment, returning the results of the policies may comprise storing a log of policy results associated with a given policy and runbook. In alternative embodiments, the method 300 may maintain a log of individual events and the results of applying the policy for a given event. In this manner, the method 300 allows operators to evaluate the efficiency and effectiveness of a given policy as events occur. If a given policy is deemed ineffective, the operator may request that a network administrator re-evaluate the policies for a given event to more adequately remedy the underlying event.

Figure 4:
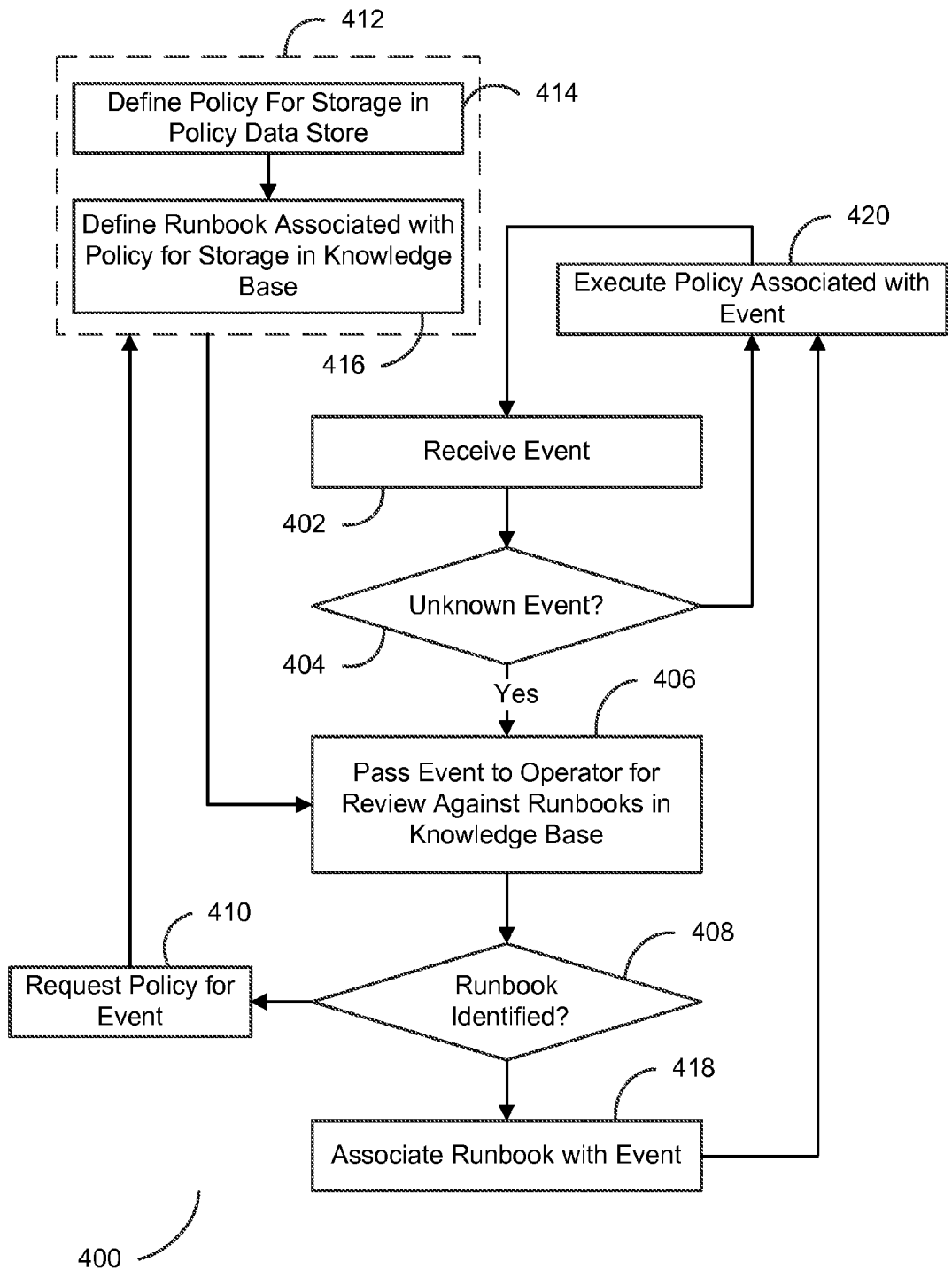
FIG. 4 presents a flow diagram illustrating a method for identifying runbooks associated with an event and organically building a knowledge base for unknown events according to one embodiment of the present invention.

FIG. 4 presents a flow diagram illustrating a method for identifying runbooks associated with an event and organically building a knowledge base for unknown events according to one embodiment of the present invention. According to the embodiment of FIG. 4, a method 400 receives an event, step 402. In one embodiment, receipt of an event may be from an existing network management system that detects events that occur within a monitored network.

The method 400 determines if the event is an unknown event or a known event, step 404. If the method 400 determines that a known event has occurred, the method 400 executes the policy associated with the event, step 408. In one embodiment, the method 400 may allow a network operator to select an identified event and, in response, identify whether the event is known. For example, an operator may be presented with an event, "ICMP Ping Failure." If the event is known, the operator may be able to select the event (e.g., right clicking) and be presented with an option to view an associated runbook containing one or more policies to be run. In an alternative embodiment, if the method 400 detects a known event, the method 400 may automatically execute known policies after determining the event is a known event.

If the method 400 determines the event is unknown, the method 400 passes the event to the operator for review against runbooks in the knowledge base, step 406. In one embodiment, the operator may inspect stored documentation within the knowledge base to determine if an existing policy has previously been stored and is applicable to the unknown event. For example, in response to an unknown event, an operator may query the knowledge base to identify similar events and determine that the policies associated with a similar event are applicable to the unknown event. In similar fashion, the operator may identify that the unknown event is simply a false negative and corresponds to an existing, known event. In accordance with other embodiments of the invention, automated hardware and software processes, with or without operator input, may be operative to review events against runbooks in the knowledge base, as well as perform other operator tasks in an automated fashion or with minimal operator input, e.g., exception handling.

If the operator identifies a relevant runbook within the knowledge base, step 408, the method 400 may associate the runbook with the event, step 418. In one embodiment, after identifying the appropriate runbook(s), an operator may update the knowledge base to associate the previously unknown event with existing runbook documentation. In this respect, if the method 400 receives the previously unknown event again, the method 400 may then be able to identify the event, step 404, and execute the one or more identified policies associated with the new event runbook, step 420. Returning to the method of associating documentation with an unknown event, after the method 400 associates documentation with the previously unknown event, the method executes a policy associated with the event, step 420. As previously discussed, the policies associated with an event may be associated with an event via an entry into the runbook associated with the event and stored within a knowledge base.

If the method 400 does not identify a runbook for the unknown event, the method 400 transmits a request for a policy to handle the event, step 410. In the illustrated embodiment, an operator may request a policy from an administrator for the unknown event. For example, upon detecting an unknown event and after determining that a suitable runbook does not exist, the method 400 may allow the operator to request a new runbook from a network administrator. In one embodiment, the method 400 may populate fields within a graphical user interface with the unknown event data to minimize the risk of operator error in reporting the unknown event to an administrator.

After requesting a policy for the unknown event, the method 400 may execute a sub-method 412 for policy and runbook generation. In one embodiment, an administrator may perform the sub-method 412, whereas an operator or above-described automated processes may perform the previously discussed steps. In the illustrated embodiment, the method 414 defines a policy for storage in a policy data store, step 414, e.g., an administrator may review the unknown event and determine or otherwise develop an appropriate policy for the unknown event.

In addition to defining a new policy for the unknown event, the administrator may additionally define a runbook (e.g., documentation) associated with the policy for storage in the knowledge base, step 416. Documentation for the policy may comprise a description of the event and a discussion of the steps to be taken on the basis of the event. After defining the documentation, the method 400 may associate the runbook with the underlying event in the knowledge base for subsequent use.

Continuing with the method 400, an operator may be passed the event, step 406, and, in one embodiment, may identify the new runbook as being associated with the previously unknown event, step 408. The method 400 may then associate the new runbook with the event, step 418, and execute the one or more policies associated with the runbook, step 420, as previously discussed. The network may continue to be monitored for the generation and propagation of both known and unknown events, step 402.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A system for automating runbook documentation for unknown events based on known events, the system comprising:
   one or more memory devices comprising:
      a policy data store operative to store policies created by a network administrator;
      an events data store operative to store known events;
      a knowledge base operative to store runbooks associated with known events within the events data store and return a runbook in response to a request for the runbook associated with a given, known event, the runbooks including one or more references to policies within the policy data store;
   a processing device operative to receive selections of the runbooks to execute for an unknown event, after determining that the unknown event is not stored within the events data store, provide execution results of the policies referenced by the selected runbooks for the unknown event, facilitate requests for re-evaluation of policies for the unknown event based on the execution results associate the unknown event with the selected runbook, and storing the association between the unknown event and the selected runbook in the knowledge base; and
   a policy engine operative to subsequently execute policies referenced by the runbooks associated with the events within the events data store for the unknown event based on the association of the unknown events with the selected runbooks.

2. The system of claim 1 wherein the policy engine is operative to automatically execute policies for a known event.

3. The system of claim 1 wherein the policy engine is operative to execute a policy for a known event in response to a request from a network operator.

4. The system of claim 1 wherein the knowledge base is operative to store runbooks in response to a request from a network operator for a creation of a new runbook for an unknown event.

5. The system of claim 4 wherein the new runbook is created by a network administrator.

6. The system of claim 1 wherein the knowledge base is operative to be searched by a network operator for an existing runbook.

7. The system of claim 1 comprising at least one network operator workstation and at least one network administrator workstation communicatively coupled to the knowledge base.

8. A method for automating runbook documentation for unknown events based on known events, the method comprising:
   receiving a network event;
   determining whether the event is a known or unknown event;
   executing a policy referenced by a runbook associated with the event if the event is a known event;
   passing the event for review against a database of existing runbooks after determining that the unknown event is not stored within the events data;
   receiving selection of one or more existing runbooks to execute for the unknown event;
   associating the unknown event with one or more of the selected runbooks;
   executing a policy referenced by the one or more selected runbooks from the database for the unknown event;
   providing execution results of the policy referenced by the one or more selected runbooks for the unknown event;
   facilitate a request for re-evaluation of the policy referenced by the one or more selected runbooks for the unknown events based on the execution results;
   associating the unknown event with the one or more selected runbooks;
   storing the association between the unknown event and the selected runbook; and
   requesting a new policy for the unknown event if an existing runbook is not selected to execute for the unknown event.

9. The method of claim 8 wherein executing a plicy and executing an existing policy occur automatically.

10. The method of claim 8 wherein executing a policy and executing an existing policy occur in response to a request from a network operator.

11. The method of claim 8, comprising storing runbooks in response to a request from a network operator for a creation of a new runbook for an unknown event.

12. The method of claim 11, wherein the new runbook is created by a network administrator.

13. The method of claim 8, wherein executing a policy associated with the event if the event is a known event comprises searching for an existing runbook containing policies associated with the event.

14. The method of claim 8, comprising associating existing runbooks with unknown events.

15. Non-transitory computer readable media comprising program code for execution by a programmable processor that instructs the processor to perform a method for automating runbook documentation for unknown events, based on known events, the computer readable media comprising:
   program code for receiving a network event;
   program code for determining whether the event is a known or unknown event;
   program code for executing a policy referenced by a runbook associated with the event if the event is a known event;
   program code for passing the event for review against a database of existing runbooks after determining that the unknown event is not stored within the events data;
   program code for receiving selection of one or more existing runbooks to execute for the unknown event;
   program code for associating the unknown event with the one or more of the selected runbooks;
   program code for executing a policy referenced by the one or more selected runbooks from the database for the unknown event;
   program code for providing execution results of the policy referenced by the one or more selected runbooks for the unknown event;
   program code for facilitating a request for re-evaluation of the policy referenced by the one or more selected runbooks for the unknown event based on the execution results;
   program code for associating the unknown event with the one or more selected runbooks;
   program code for storing the association between the unknown event and the selected runbook; and
   program code for requesting a new policy for the unknown event if an existing runbook is not selected to execute for the unknown event.

16. The computer readable media of claim 15 wherein executing a policy and executing an existing policy occur automatically.

17. The computer readable media of claim 15 wherein executing a policy and executing an existing policy occur in response to a request from a network operator.

18. The computer readable media of claim 15, comprising program code for storing runbooks in response to a request from a network operator.

19. The computer readable media of claim 18, wherein the new runbook is created by a network administrator.

* * * * *